United States Patent [19]
Holubka et al.

[11] 4,456,739
[45] Jun. 26, 1984

[54] COATING COMPOSITION COMPRISING CHAIN-EXTENDABLE CROSSLINKABLE POLYOL AND DIBLOCKED DIISOCYANATE DIUREA OLIGOMER

[75] Inventors: Joseph W. Holubka, Livonia; Ray A. Dickie, Birmingham, both of Mich.

[73] Assignee: Ford Motor Company, Dearborn, Mich.

[21] Appl. No.: 491,468

[22] Filed: May 4, 1984

Related U.S. Application Data

[62] Division of Ser. No. 334,796, Dec. 28, 1981, Pat. No. 4,410,678.

[51] Int. Cl.³ .................... C08G 18/32; C08G 18/80; C08L 63/00; C08L 61/28
[52] U.S. Cl. .................... 525/510; 525/454; 525/528; 525/456; 528/45
[58] Field of Search ............ 528/45; 525/454, 456, 525/510, 528

[56] References Cited

U.S. PATENT DOCUMENTS

| | | | |
|---|---|---|---|
| 2,528,360 | 10/1950 | Greenlee | 525/510 |
| 2,568,885 | 1/1939 | Dreyfus | 528/45 |
| 3,242,230 | 3/1966 | Habib | 525/456 |
| 3,248,371 | 4/1966 | Damusis | 528/45 |
| 3,393,177 | 7/1968 | Guest et al. | 528/45 |
| 3,442,974 | 5/1969 | Bremmer | 525/490 |
| 3,597,495 | 8/1971 | Sekamkes | 428/425.3 |
| 3,745,138 | 7/1973 | Koerner et al. | 524/557 |
| 3,893,978 | 8/1975 | de Cleur | 528/45 |
| 3,933,759 | 1/1976 | Hoeschele | 528/45 |
| 3,962,521 | 6/1976 | Chang et al. | 428/304.4 |
| 3,984,376 | 10/1976 | Yokono | 528/45 |
| 4,089,844 | 5/1978 | Tsou | 528/45 |
| 4,101,603 | 7/1978 | Smith | 525/415 |
| 4,134,865 | 1/1979 | Tominaga | 528/45 |
| 4,284,572 | 8/1981 | Stanley | 528/45 |
| 4,294,940 | 10/1981 | Hino | 528/45 |
| 4,315,840 | 2/1982 | Kempter | 528/45 |

*Primary Examiner*—Paul Lieberman
*Attorney, Agent, or Firm*—Peter D. McDermott; Roger L. May

[57] ABSTRACT

Resin composition suitable for high solids, solvent-based coating composition comprises chain-extendable, crosslinkable polyol of molecular weight about 100 to 1000, having at least three hydroxyl groups, chain-extendable diblocked diisocyanate diurea oligomer of molecular weight about 200 to 1500, comprising the reaction product of a half-blocked diisocyanate with diamine, crosslinking agent reactive with the hydroxy functionality of the polyol and substantially unreactive with the de-blocked isocyanate functionality of said diblocked diisocyanate diurea oligomer, and, preferably, catalyst(s). The composition cures at elevated temperature to provide a coating on a substrate, such as steel, which coating is highly resistant to corrosion, humidity and solvents and provides corrosion protection for the substrate. The half-blocked diisocyanate is preferably the reaction product of an organic diisocyanate with monofunctional blocking agent. The polyol is preferably the reaction product of a diol of molecular weight about 60 to 500 with a diepoxide of molecular weight about 100 to 1000 such as bisphenol A epichlorohydrin epoxy resin, hydantoin epoxy resin and the like.

19 Claims, No Drawings

COATING COMPOSITION COMPRISING CHAIN-EXTENDABLE CROSSLINKABLE POLYOL AND DIBLOCKED DIISOCYANATE DIUREA OLIGOMER

This is a division of application Ser. No. 334,796, filed Dec. 28, 1981, now U.S. Pat. No. 4,410,678.

INTRODUCTION

This invention relates to novel high solids, solvent-based, thermosetting resin coating compositions comprising chain-extendable, crosslinkable low molecular weight polyol, diblocked diisocyanate diurea oligomer and crosslinking agent reactive with the polyol but substantially unreactive with isocyanate functionality. The compositions are useful to make coatings which are highly resistant to corrosion, humidity and solvents.

RELATED APPLICATIONS

This application is related to application Ser. Nos. 334,795 now U.S. Pat. No. 4,403,086, 334,797, now U.S. Pat. No. 4,410,679 and 334,798.

BACKGROUND OF THE INVENTION

Solvent based coating compositions are known which employ high molecular weight (e.g. 2,000 to 10,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 540 g/l.

Elimination of the volatile organic solvent portion during curing of these conventional low-solids coating compositions presents toxicity and in some cases flammability hazards. Furthermore, bulk volume of these coating compositions is relatively large and therefore presents undesirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, governmental guidelines for 1982 presently require that emissions of volatile organic form automotive vehicle primer coating operations be reduced to that equivalent to using coating compositions of no greater than 350 g/l (2.9 lb./gal.) VOC. To meet governmental guidelines, coating compositions of VOC greater than 350 g/l can be employed in conjunction with emissions treatment equipment to achieve the specified emissions limit. Such treatment equipment presents significant additional expense, however, and thus there is a great need to provide coating compositions of VOC reduced near to, or preferably even lower than, the 350 g/l governmental limit.

In response to these concerns, high solids coating compositions have been suggested which, typically, employ low molecular weight multi-functional adducts or copolymers in combination with multi-functional crosslinking agents. These high solids coating compositions are less viscous and, therefore, can be applied by spraying, for example, with far lower VOC than was possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote polymerization and crosslinking of the multi-functional low molecular weight component(s).

Typically, these known high solids coating compositions yield cured coatings having polymeric networks that differ significantly in structure and morphology from the polymeric networks provided by conventional, low solids coating compositions comprising high molecular weight polymers. Consequently, the physical properties of the coatings provided by such high solids coatings compositions can differ significantly from those of the cured coatings provided by conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrate. Accordingly, it would be highly desirable to provide a coating composition comprising low molecular weight materials suitable for use in high solids, solvent based coating compositions and yet which, upon curing, form coatings having polymeric networks similar in structure and morphology to those obtained with conventional low solids solvent-based coating compositions, and thus having physical properties comparable to those obtained from conventional low solids solvent based coating compositions.

Accordingly, it is an object of the present invention to provide novel high solids, solvent-based coating compositions. In this regard, it is a particular object of the invention to provide novel coating compositions which are curable by chain-extension and crosslinking during cure, in situ, to form polymeric networks similar in structure and morphology to those obtainable through use of conventional low solids, solvent-based coating compositions.

It is a particular object of the invention to provide a coating composition of sufficiently low VOC to meet governmental guidelines. It is also an object of the invention to provide such a coating composition which can be applied to a substrate by spraying or other known method.

It is another object of the invention to provide a method of making a coating on a substrate, which coating has a polymeric network similar in structure and morphology to that provided by conventional low solids solvent-based coating compositions and having similar advantageous physical properties including, for example, humidity and solvent resistance and corrosion protection for the underlying substrate. Additional aspects and advantages of the invention will be apparent from the following description thereof.

SUMMARY OF THE INVENTION

According to the invention, a high solids, organic solvent based thermosetting resin composition comprises chain-extendable, crosslinkable low molecular weight polyol, having at least three hydroxyl groups, and chain-extendable low molecular weight diblocked diisocyanate diurea oligomer, and further comprises suitable crosslinking agent such as, for example, aminoplast crosslinking agent which is reactive with the polyol and is substantially unreactive with the diblocked diisocyanate diurea oligomer, in particular, with isocyanate functionality. The coating composition further comprises suitable organic solvent such as, for example, butanol or other lower alkanol and, preferably, a catalyst for the crosslinking reaction and/or for the chain-extension reaction. The diblocked diisocyanate diurea oligomer is of molecular weight between about 300 and about 1500, preferably between about 300 and about 800, and preferably is the reaction product of a half-blocked diisocyanate with a suitable diamine. It has a thermal de-blocking temperature of about 100° C. to 190° C. Preferred polyols are of molecular weight between about 200 and about 1000, more preferably between about 200 and about 700, and include the reaction product of a suitable diol with a diepoxide of molecular weight between about 100 and about 1000.

According to another aspect of the invention, a method of making a corrosion, solvent and humidity resistant coating on a substrate comprises applying to the substrate the high-solids, solvent-based thermosetting resin composition of the invention and heating the resin compositions to between about 100° C. and about 190° C. and preferably to between about 130° C. and about 150° C. for a period sufficient to yield a cured coating.

The novel coating composition of the invention comprises latent interreactive bifunctionality suitable for substantially linear chain-extension polymerization, in situ, on the surface of the substrate during cure of the coating and further comprises hydroxy crosslinking functionality. That is, the coating compositions of the invention form a coating on a substrate employing two different reactions, a chain-extension polymerization reaction, to form high molecular weight hydroxy functional polyurea polymers and a crosslinking reaction involving said hydroxy functional polyurea polymers and a crosslinking agent. For reasons discussed further below, it is a significant aspect of the invention that the crosslinking reaction is distinct from the chain-extension reaction.

DETAILED DESCRIPTION OF THE INVENTION

As used herein, a high solids coating composition is one in which a volatile organic solvent content of about 400 g/l (3.4 lb./gal.) or less yields a viscosity of less than approximately 35 sec. #4 Ford Cup at 27° C. (80° F.).

Preferred chain-extendable, crosslinkable, low molecular weight polyols suitable for use in the coating composition of the invention comprise three or more hydroxyl groups, preferably from 3 to 10 hydroxyl, such that upon chain-extension reaction with a deblocked isocyanate functionality of each of two deblocked diisocyanate diurea molecules, during cure, in situ, on the surface of the substrate, there remains at least one additional unreacted hydroxy functionality for crosslinking reaction with a suitable crosslinking agent such as, for example, an aminoplast crosslinking agent. The polyol preferably has a molecular weight between about 200 and about 1000, and more preferably between about 300 and about 700. Exemplary polyols suitable for the present invention include polyhydroxy functional straight or branched chain saturated or unsaturated hydrocarbons, optionally comprising one or more oxy or ester moieties and optionally comprising one or more heterocyclic atoms, aromatic and/or heterocyclic rings, the heterocyclic atom(s) being selected preferably from N, O and S. Suitable polyol reactants include many commercially available materials well known to the skilled of the art.

Preferred chain-extendable, crosslinkable polyols include epoxy-diol adducts, which can be provided as the reaction product of a suitable diepoxide with a suitable diol. Preferably the diepoxide (or each of them) has a number average molecular weight between about 100 and about 1000, and more preferably between about 100 and about 700. Numerous such preferred diepoxides are readily commercially available, including, for example, Bisphenol A epichlorohydrin epoxy resins, for example, the Epon (trademark) series and the Eponex (trademark) series of Shell Chemical Company, Houston, Tex., and the DER (trademark) series, Dow Chemical Company, Midland, Mich. Also preferred are cyclic aliphatic diepoxy resins, for example, the hydantoin epoxy resins, for example, Resin XB2793 (trademark) of Ciba-Geigy Corporation, Ardsley, N.Y. Preferred diepoxides are terminal diepoxides, since these are generally more reactive and therefore require reaction conditions under which undesirable side reactions, for example, epoxy-epoxy reactions and gellation, can be more easliy avoided. Most preferred in view of their commercial availability are Bisphenol A epichlorohydrin epoxy resins, for example, Epon 828 (trademark), Shell Chemical Co., Houston, Tex. Other, higher molecular weight members of the Epon (trademark) series are suitable to make higher molecular weight polyols which provide coating compositions of somewhat higher viscosity (or lower solids content). It should be recognized, however, that the higher molecular weight members of the Epon series, for example Epon 1001 and Epon 1004, may be somewhat less preferred, since undesirable side reactions may occur, for example, reaction between the epoxy functionality and an hydroxyl group of another diepoxide (rather than with an hydroxy group of a diol). Also, however, improved properties, for example, improved corrosion resistance have been achieved with coating compositions comprising polyols prepared using such materials and the choice of suitable polyols (and of reactants for preparing same) will depend upon the particular application intended for the coating composition. Also preferred are any of a wide variety of acyclic or cyclic aliphatic diepoxides such as, for example, 1,4-butanediol diglycidyl ether and 4-vinylcyclohexene dioxide and the like or a mixture of any of them.

The diol suitable for preparing the polyol component of the coating composition can be any of a wide variety of readily commercially available dihydroxy functional materials of which many are known to the skilled of the art. Preferred diols include those of molecular weight between about 60 to 500, more preferably about 60 to 200. Most preferred are terminal diols, that is, diols bearing terminal hydroxy functionality, for example, 1,6-hexanediol since these are generally more reactive. Other suitable aliphatic diols include primary/secondary and secondary/secondary carbon hydroxy substituted diols. Diols bearing tertiary hydroxy functionality are least preferred due to their lower reactivity. Thus, preferred diols include, for example, alkyl substituted or unsubstituted propanediol, butanediol, pentanediol, hexanediol, and a mixture of any of them. Preferred aliphatic diols include, aliphatic diols of about 2 to 20 carbons, for example, ethylene glycols, 1,3-propanediol, 1,4-butanediol, 1,5-pentanediol, 2-ethyl-1,3-hexanediol and the like, or a compatible mixture of any of them. Other suitable aliphatic diols include, for example, ether diols, especially those of 4 to about 20 carbons, for example, triethylene glycol and the like. Suitable aromatic diols include those wherein one or both hydroxy groups are substituted on a benzene ring. Preferred aromatic diols comprise two hydroxyl groups substituted on the same benzene ring or on different benzene rings linked through a covalent bond or through one or more carbons of a one to seven carbon, preferably three to five carbon, aliphatic moiety. Suitable aromatic diols include, for example, 4,4'-isopropylidenediphenol (Bisphenol A), 4,4'-(1-methyl-propylidene)bisphenol (Bisphenol B), catechol, and the like, or a compatible mixture of any of them.

The diepoxide is reacted with the diol according to methods well known to the skilled of the art, preferably by slow addition to sufficient excess of diol such that substantially each epoxide group reacts with an hydroxyl group of a different diol molecule. The resultant epoxy-diol adduct comprises four hydroxy groups: the one unreacted hydroxyl group of each of the two diol molecules which reacted with the diepoxide, and the hydroxyl group formed by each of the two cleaved epoxide rings. Employing a terminal diol and terminal diepoxide, the polyol reaction product has two terminal hydroxyls, each linked through a diol residue to the dihydroxy substituted diepoxide residue. Whether or not the polyol comprises epoxy/diol adduct, as just described, it is preferred that two of the three or more hydroxyls of the polyol be remote from one another and most preferred that they be terminal hydroxyls.

The diblocked diisocyanate diurea oligomer of the coating composition preferably has a molecular weight between about 300 and about 1500, more preferably between about 300 and about 800. According to the present invention, preferred diblocked diisocyanate diurea oligomer of the coating composition is prepared by reaction of a suitable half-blocked diisocyanate with a suitable diamine. It will be within the skill of the art in view of the present disclosure to select a suitable diamine, of which many, including aromatic and aliphatic diamines, are readily commercially available. Preferred aliphatic diamines are of molecular weight about 50 to about 700, more preferably about 50 to about 300 and include, for example, alkylenediamines, wherein the alkylene moiety is straight or branched chain and has, preferably, about from 2 to 20, more preferably about 3 to 12 carbons, and of which terminal alkylenediamines, that is alkylenediamines bearing two terminal amine functionality, are most preferred, for example, 1,6-hexanediamine, 1,5-pentanediamine, 1,4-butanediamine and a mixture of them. Also preferred are cycloaliphatic diamines of about 4 to about 20 carbons, for example, isophorone diamine, and aromatic diamines wherein each amine is substituted on the same benzene ring or on different benzene rings linked through a covalent bond or through one or more carbons of a one to seven carbon aliphatic moiety, for example, toluene diamine and 4,4'-methylenedianiline.

Suitable half-blocked diisocyanate is prepared by reaction of organic diisocyanate with a suitable monofunctional blocking agent. Suitable readily commercially available monofunctional blocking agents are well known to the skilled of the art. The blocking agent is selected such that the blocked isocyanate group will remain blocked for long periods of time at normal storage temperatures but will be substantially totally "de-blocked" at elevated "cure" temperature. In addition, since the blocking agent will be released when the coating composition is cured by baking, it is preferred that the blocking agent have high volatility near the de-blocking temperature and so will diffuse rapidly through the coating composition and evaporate completely therefrom during the baking step. Any blocking agent allowed to remain in the cured coating should be inert to the cured coating and to the substrate and to any other coatings to be used in conjunction therewith. It will be within the skill of those skilled in the art, in view of the present disclosure, to select a suitable blocking agent to provide a de-blocking temperature meeting the requirements of each particular application of the present invention. It will typically be preferred that the blocked isocyanate functionality be de-blocked (i.e., that the coating composition be curable) at a temperature within the range of about 100° to 190° C., more typically about 130° C. to 150° C. Accordingly, preferred monofunctional blocking agents are selected from amides, for example caprolactam, phenols, ketoximes and lower alcohols, for example alkanol of one to about eight carbons, for example, methanol, ethanol, any propanol, any butanol, any pentanol, including cyclopentanol, and the like, or a mixture of any of them.

Suitable organic diisocyanates are readily commercially available and include many known to the skilled of the art such as, for example, phenylene diisocyanates, toluene diisocyanates, isophorone diisocyanates, diisocyanatoalkane wherein the alkylene moiety has, preferably, from about three to ten carbons, for example, 1,6-hexane diisocyanate, or the like or a compatible mixture of any of them. Most preferably the organic diisocyanate has a molecular weight less than about 250. If corrosion resistance is of primary concern in the cured coating, for example in the case of an automotive vehicle primer or topcoat, it may be preferred to use an aliphatic diisocyanate, for example, isophorone diisocyanate and 1,6-hexane diisocyanate. Aromatic diisocyanates provide suitable coatings, however, and may be preferred in view of their lower cost.

Suitable half-blocked diisocyanate is prepared by reaction of the organic diisocyanate with sufficient monofunctional blocking agent to block approximately one half of the isocyanate functionality. Accordingly, approximately one molar equivalent of monofunctional blocking agent is reacted with one molar equivalent of the organic diisocyanate. Suitable techniques well known to the skilled of the art can be employed to maximize the yield of half-blocked diisocyanate, such as, for example, adding the blocking agent slowly to the organic diisocyanate under reaction conditions.

The half-blocked diisocyanate is reacted with the previously described diamine according to methods well known to the skilled of the art to produce the diblocked diisocyanate diurea oligomer of the invention. That is, the free (i.e., unreacted) isocyanate group of two half-blocked diisocyanate molecules each reacts with one of the two amine groups of a diamine molecule. Each generates a urea linkage. The reaction product comprises two blocked isocyanate groups. During cure, each blocked isocyanate group is de-blocked and will undergo chain-extension reaction with an hydroxyl group of the polyol component of the coating composition of the invention. The half-blocked diisocyante and diamine are reacted in molar ratio of 2:1, respectively. While not wishing to be bound by theory, it is believed that substantial advantage is derived from the high alkaline stability of the urea linkage. That is, due to the high alkaline stability of the urea linkages, the cured coating provided by the invention is more resistant to hydrolysis in a corrosive environment. Accordingly, the coating compositions of the invention comprising urea linkages show improved corrosion resistance in comparison to other coatings, for example those having ester or even urethane linkages.

The coating composition of the invention comprises latent interreactive bifunctionality suitable for substantially linear chain-extension polymerization, namely, the hydroxy functionality of the polyol and the blocked isocyanate functionality of the diblocked disocyanate diurea oligomer. It further comprises hydroxy functionality suitable for crosslinking reaction separate and distinct from the chain-extension reaction. It is preferred that the blocked isocyanate groups and two of the three or more hydroxyl groups of the polyol each be an end group. Reactions between such hydroxyl end groups and blocked isocyanate end groups are believed to provide most efficient chain-extension during cure.

The molecular weight of the polyol and of the diblocked diisocyanate diurea oligomer will affect the volatile organic content of the coating composition comprising same. Where a high-solids coating composition is desired, preferably the molecular weight of each is within the ranges specified above, since this has been found to provide high-solids resin compositions according to the invention which can be applied to a substrate by spray or other means in a coating composition having a volatile organic content as low as about 350 to 400 g/l (2.9 to 3.4 lb./gal.) or less.

Suitable crosslinking agent is that which will react with the hydroxy functionality of the long chain polymer product of the chain-extension polymerization reaction between the polyol and de-blocked diisocyanate diruea oligomer. Suitable crosslinking agents will not react, however, with the de-blocked isocyanate groups. Accordingly, crosslinking reaction in the preferred coating composition is a reaction separate and distinct from the hydroxy-isocyanate chain-extension reaction. Numerous such crosslinking agents are well known to the skilled of the art and include, for example, any of a variety of aminoplast crosslinking agents, for example, partially alkylated melamines (melamines formaldehyde resins modified by alcohols), for example, partically methylated melamines and butylated melamines, polyalkyl ethers of the polymethylol melamines, for example, hexamethoxy methylmelamine; urea formaldehyde condensate modified by alcohol, for example, butylated urea resin; polymerides of formaldehyde, for example, paraformaldehyde and trioxane; polymethylol compounds of hexamethylene diurea; adipic acid dimethylol amide and methylol ether thereof; tetramethylolhydrazodicarbonamide; polymethylol compounds of polycaprolactam and methylol ethers thereof; and the like or compatible mixtures of any of them. Other suitable crosslinking agents will be apparent to the skilled of the art in view of the present disclosure. Hexamethoxymethyl melamine is preferred since it is readily commercially available, is of low molecular weight and has been found to provide suitable crosslinking activity.

The oligomer and polyol of the invention are used preferably in molar equivalent ratio of about 1:1 to about 1:3, more preferably about 1:1 to about 1:1.2, respectively. The proper proportion of crosslinking agent in the coating composition will depend upon the properties desired in the coating to be produced. Generally a somewhat less than stoichiometric amount of crosslinking agent can be used to provide a cured coating of greater flexibility. Where hexamethyoxymethyl melamine or the like is employed with any of the preferred polyol and diblocked diisocyanates diurea oligomers described above, a generally prefered molar equivalent ratio of crosslinking agent to polyol is about from 1:15 to 1:1, more preferred being about from 1:1 to 1:5, respectively. Too much crosslinking agent can produce a coating which is brittle and humidity sensitive. If too little is used, the coating will not cure properly.

It will be within the skill of the art to determine the proper volatile organic content for a given coating composition of the invention, for a given application. In general, preferred solvents are those having a boiling point between about 60° C. and about 200° C., more preferably between about 110° C. and about 170° C. Preferred solvents include, for example, butanol, methyl amyl ketone and the like, or a mixture thereof such as a 1:2 mixture of butanol and methyl amyl ketone, respectively, which is generally preferred for coating compositions intended for automotive vehicle coating operations and the like. Additional suitable solvents will be apparent to the skilled of the art in view of the present disclosure.

Any solvent allowed to remain in the cured coating must be inert so as to avoid adverse effect upon the cured coating or upon another coating used in conjunction with it, during the curing process or thereafter. Preferrably, the cured coating is completely free of solvent. The preferred solvents, in addition have relatively low volatility at temperatures appreciably below their boiling points such that solvent evaporation is low during storage and/or application of the coating composition to the substrate.

Sufficient solvent is used to reduce the viscosity of the coating composition to a level suitable for application to the substrate in the desired manner. While conventional epoxy ester-type automotive spray-applied primer coating compositions are known to require a volatile organic content of about 540 g/l, the novel coating compositions of the present invention require as little as 350-400 g/l or less VOC to provide a spray viscosity of 25-35 sec, #4 Ford Cup. Of course, the coating compositions of the invention need not be formulated as a "high solids" composition, but rather can have a higher VOC to provide a lower viscosity. It is generally preferred that sufficient solvent be used to provide a viscosity of about 15 to 35 seconds, No. 4 Ford Cup at 27° C. (80° F.).

Also preferably included in the coating composition of the invention is any of a variety of acid catalysts known to the skilled of the art to catalyze the aminoplast crosslinking reaction, for example, p-toluenesulfonic acid, phosphoric acid, phenyl acid phosphate, butyl phosphate, butyl maleate, and the like or a compatible mixture of any of them. In addition, any of a variety of catalysts for the isocyanate de-blocking reaction can also be included in the coating composition, for example, dibutyl tin dilaurate. In addition, a flow control agent, for example, polybutyl acrylate; wetting agent, for example, silicone; pigment; a pigment dispersent; and/or a corrosion inhibitor, for example, chromate pigment, numerous of all of which are known to the skilled of the art, may be employed in the coating compositions of the invention.

It should be recognized that the coating compositions can comprise a diol in addition to the polyol. The diol would contribute no crosslinking functionality to the high molecular weight chain-extended polymerization product of the cured coating. That is, the diol would provide two hydroxy for chain-extension reaction with de-blocked isocyanate functionality, but would provide no additional hydroxyl on the polymerization product for crosslinking reaction with the crosslinking agent. By simple adjustment of the proportion of diol to polyol in the coating composition, the crosslink density in the cured coating, and therefore the degree of flexibility of the cured coating can be accurately controlled. Suitable, readily commercially available diols will be apparent to the skilled of the art in view of the present invention. Preferred diols include those described above as being preferred for use in preparing the polyol by reaction with diepoxide.

According to another aspect of the invention, a coating on a substrate is provided, which coating comprises the chain-extended, crosslinked polymer product following cure of a coating comprising the coating composition of the invention. The coating composition can be a low solids composition, that is, it can have a high VOC, but generally a high solids composition, that is, one having a low VOC is preferred for the reasons given above. It can be applied by any conventional method, including brushing, dipping, flow coating, spraying, etc. Spraying will generally be preferred, for example, for applying the composition as an automotive primer or topcoat. In such spraying applications, the coating compositions of the invention are especially advantageous for use as high solids compositions. In this regard, coating compositions of the invention employing preferred polyol, diblocked diisocyanate diurea oligomer, crosslinking agent and solvent, as described above, are suitable to be applied to a substrate by spraying even though formulated at volatile organic content levels as low as about 350 to 400 g/l (2.9 to 3.4 lb/gal).

Curing the coating composition requires baking for sufficient time at sufficiently elevated temperature to de-block the blocked isocyanate functionality of the diblocked diisocyanate diurea oligomer. The time and temperature required to cure the coating are interrelated and depend upon the particular polyol, diblocked diisocyanate, crosslinking agent, solvent and other materials, if any, and the amount of each comprising the coating composition. Employing a volatile organic content of about 350 g/l and selecting preferred components as described above, the required bake time and temperature is typically about 20 to 30 minutes and about 180° C. The temperature required for cure can be reduced to 150° C. for 20 to 30 minutes by addition of suitable catalyst such as any of those known to the skilled of the art, for example, dibutyl tin dilaurate.

High solids coating compositions according to the present invention, comprising the low molecular weight chain-extendable, crosslinkable polyol, especially the preferred epoxy/diol adducts described above, low molecular weight chain-extendable diblocked diisocyanate diurea oligomer and, preferably, an aminoplast crosslinking agent, for example, hexamethoxymethyl melamine, have been found to afford cured coatings with corrosion inhibition properties comparable to conventional epoxy ester based, low solids sprayable coating compositions. The significant reduction in volatile organic content made possible by the coating composition of the invention is, therefore, a highly advantageous advance in the art.

As it is presently understood, chain-extension reactions by each of two hydroxyls of the polyol molecules with an isocyanate functionality of different diblocked molecules, which are de-blocked at cure temperatures, provides substantially linear chain-extension, in situ, on the surface of the substrate during cure of the coating composition. The additional hydroxy functionality of the polyol not undergoing chain-extension reaction is available for crosslinking reaction with the crosslinking agent. While not wishing to be bound by theory, it is presently understood that upon curing a coating composition according to the present invention, the blocked isocyanate group is de-blocked and reacts more readily with the least sterically hindered of the available hydroxyl groups. If the polyol comprises a terminal hydroxyl group, as in preferred embodiments described above, then the de-blocked isocyanate group would react most readily with such terminal hydroxyl group and not with any of the one or more additional, non-terminal hydroxy group(s) of the polyol (or of the extended chain polymer being formed by the curing process). Such additional non-terminal hydroxy functionality remains available for crosslinking reaction. If, for example, the polyol employed is an epoxy/diol adduct reaction product of a terminal diol, for example, 1,6-hexanediol, with a terminal diepoxide, for example, an hydantoin epoxy resin, then the polyol will have two terminal hydroxyls and two non-terminal hydroxyls (formed by cleavage of the epoxide rings). During cure, according to present understanding, the de-blocked isocyanate functionality will react predominantly with the terminal hydroxyl. The result is substantially linear chain-extension polymerization, in situ, on the surface of the substrate, to form long chain, high molecular weight polymers with pendant hydroxyl groups available for crosslinking reaction. Accordingly, the polymer networks obtained during cure of the coating compositions of the present invention are believed to be similar in structure to those obtained using conventional low solids solvent based coating compositions. This result is also indicated by the improved physical properties, especially by the improved flexibility provided by the cured coating in comparison to that which has been achieved with conventional high molecular weight coating compositions.

Even where an isocyanate group does not react with a terminal hydroxyl group, however, the isocyanate groups can react only with the polyol, since they are not reactive with the crosslinking agent, and the result is substantially linear chain-extension polymerization.

In addition, network crosslink density can be controlled, and therefore the flexiblity of the cured coating can to a large extent be controlled by proper selection of the polyol. Crosslink density increases and flexibility decreases as the hydroxy functionality is increased and/or as the molecular weight of the polyol and/or of the diblocked diisocyanate diurea oligomer is reduced. Thus, it will be apparent to the skilled of the art that if the polyol and diblocked diisocyanate diurea oligomer are prepared according to the preferred embodiments described above, then the selection of the diol, diepoxide, half-blocked organic diisocyanate and diamine reactants provides substantial control of the crosslink density in the cured coating. The greater the molecular weight of the reactants, the lower will be the crosslink density. Thus, for example, where the polyol is the reaction product of a diepoxide and a diol, there will be a higher crosslink density in the cured coating if the diol is 1,3-propanediol than if it is 1,6-hexanediol.

In addition, it will be recognized by the skilled of the art in view of the present disclosure that higher molecular weight components in the coating composition will, in general, provide a more viscous coating at a given VOC. Higher molecular weight polyol and diblocked diisocyanate diurea oligomer are for that reason less preferred where a high solids coating composition is desired.

Cured coatings according to the invention have been found to provide excellent corrosion resistance when applied over a metallic substrate such as, for example, when applied as an automotive vehicle primer coat over bare sheet steel. While not wishing to bound by theory, the exceptional corrosion inhibitors provided by preferred embodiments described above stem, in part, from the absence of ester linkages. Ester linkages are known to be attacked by hydroxide, a product of the metal corrosion process.

EXAMPLE I

Preparation of Epoxy/Diol Adduct Polyol

This example illustrates the preparation of a polyol suitable for use in the coating composition of the invention. More specifically, it illustrates the preparation of an epoxy/diol adduct. Heterocyclic epoxy resin XB2793 (trademark, Ciba-Geigy Corporation), 138. g, 1,3-hexanediol, 146. g, and N,N-dimethylethanolamine, 0.5 g, are combined in methyl amyl ketone, 71. g, and refluxed approximately 40 hours until the epoxy infrared absorption disappears. The low viscosity resin product is cooled to room temperature and stored.

EXAMPLE II

Preparation of Epoxy/Diol Adduct Polyol

The example illustrates the preparation of an epoxy/diol adduct from a heterocyclic epoxy and an aromatic diol. Hydantoin epoxy resin XB2793 (trademark, Ciba-Geigy Corporation), 69. g, and Bisphenol A, 114. g, are combined in mehtyl amyl ketone, 45.8 g, and refluxed approximately 4 hours until the epoxy infrared absorption disappears. The low viscosity resin product is cooled to room temperature and stored.

EXAMPLE III

A. Preparation of Half-blocked Diisocyanate

This example illustrates the preparation of a diblocked diisocyanate diurea oligomer suitable for use in the coating composition of the present invention. An alcohol half-blocked aliphatic diisocyanate is prepared. Butyl alcohol, 18.3 g is added dropwise to a mixture of isophorone diisocyanate, 54.7 g, and dibutyl tin dilaurate, 0.3 g, in methyl amyl ketone, 18.3 g. After addition of the alcohol, the mixture is heated to between 60¼°-80° for 2 hours. (Higher temperatures were avoided to avoid undesirable side reactions.) The half-blocked diisocyanate product is characterized by infrared spectroscopy showing the absence of OH absorption at 33000 cm$^{-1}$ and 1730 cm$^{-1}$, respectively.

B. Preparation of Diblocked Diisocyanate Diurea Oligomer

The diblocked diisocyanate diurea oligomer is prepared by adding 37. g of the alcohol half-blocked aliphatic diisocyanate prepared in Part A to 58. g of 1,6-hexanediamine in 40. g of methyl amyl ketone. The rate of addition is controlled to maintain a gentle reflux. The reaction is stirred after completion of the addition for approximately 2 hours at 60° C. and then cooled to room temperature and stored. Infrared spectroscopy shows no absorption for isocyanate by the product.

EXAMPLE IV

This example illustrates the preparation of a diblocked diisocyanate diurea oligomer suitable for use in the coating composition of the present invention.

A. Preparation of Half-blocked Diisocyanate

Alcohol half-blocked aliphatic diisocyanate is prepared according to the procedure of Example III, Part A.

B. Preparation of Diblocked Diisocyanate Diurea Oligomer

The diblocked diisocyanate diurea oligomer is prepared by adding 37.0 g of the alcohol half-blocked aliphatic diisocyanate prepared in Part A to 99. g of 4,4'-methylenedianiline in 60 g methyl ethyl ketone. The ratio of addition is controlled to maintain a gentle reflux. The reaction is stirred after completion of the addition for approximately two hours at 60° C. and then cooled to room temperature and stored. Infrared spectroscopy shows no absorption for isocyanate by the product.

EXAMPLE V

This example illustrates the preparation of a diblocked diisocyanate diurea oligomer suitable for use in the coating composition of the present invention.

A. Preparation of Half-blocked Diisocyanate

Alcohol half-blocked aliphatic diisocyanate is prepared according to the procedure of Example III, Part A.

B. Preparation of Diblocked Diisocyanate Diurea Oligomer

The diblocked diisocyanate diurea oligomer is prepared by adding 37.0 g of the alcohol half-blocked aliphatic diisocyanate prepared in Part A to 85. g of isophorone diamine in 50. g methyl amyl ketone. The rate of addition is controlled to maintain a gentle reflux. The reaction is stirred after completion of the addition for approximately two hours at 60° C. and then cooled to room temperature and stored. Infrared spectroscopy shows no absorption for isocyanate by the product.

EXAMPLE VI

Preparation of Epoxy/Diol Adduct Polyol

An aromatic epoxy/branched chain aliphatic diol adduct is prepared by refluxing a mixture of the Bisphenol A epichlorohydrin epoxy resin Epon 828 (trademark, Shell Chemical Company), 190. g 2-ethyl-1,3-hexanediol, 146. g, methyl amyl ketone, 84. g, and N,N- dimethylethanol amine, 0.5 g, for about 4 to 8 hours until the infrared epoxide absorption disappears.

EXAMPLE VII

This example illustrates the preparation of a diblocked diisocyanate diurea oligomer suitable for use in the coating composition of the present invention.

A. Preparation of Half-blocked Diisocyanate

An alcohol half-blocked aromatic diisocyanate is prepared. Butanol, 18.3 g, is added dropwise, with stirring, to toluene diisocyanate, 43.1 g, and dibutyl tin dilaurate, 0.3 g in 18.3 g of methyl amyl ketone. The reaction temperature is maintained at about 60°-80° C. for two hours. The half-blocked diisocyanate product is verified by infrared spectroscopy as in Example III. The product is used in Part B.

B. Preparation of Diblocked Diisocyanate Diurea Oligomer

The diblocked diisocyanate diurea oligomer is prepared by adding 31. g of the alcohol half-blocked aromatic diisocyanate prepared in Part A to 58. g of 1,6-hexanediamine in 40. g of methyl amyl ketone. The rate of addition is controlled to maintain a gentle reflux. The reaction is stirred after completion of the addition for approximately two hours at 60° C. and then cooled to room temperature and stored. Infrared spectroscopy shows no absorption for isocyanate by the product.

EXAMPLE VIII

This example illustrates the preparation of a diblocked diisocyanate diurea oligomer suitable for use in the coating composition of the present invention.

A. Preparation of Half-blocked Diisocyanate

Alcohol half-blocked aromatic diisocyanate is prepared according to the procedure of Example VII, Part A.

B. Preparation of Diblocked Diisocyanate Diurea Oligomer

The diblocked diisocyanate diurea oligomer is prepared by adding 31. g of the alcohol half-blocked aromatic diisocyanate prepared in Part A to 85. g of isophorone diamine in 50. g of methyl amyl ketone. The rate of addition is controlled to maintain a gentle reflux. The reaction is stirred after completion of the addition for approximately two hours at 60° C. and then cooled to room temperature and stored. Infrared spectroscopy shows no absorption for isocyanate by the product.

EXAMPLE IX

Preparation of Epoxy/Diol Adduct Polyol

This example illustrates the preparation of an epoxy/diol adduct from an aromatic epoxy and a straight chain aliphatic diol. Epon 828 (trademark, Shell Chemical Company), 190. g, 1,5-pentanediol, 78. g, and dimethylethanolamine, 0.68 g, are combined in methyl amyl ketone, 67. g. The reaction mixture is heated at 100°-130° C. for 16 hours. The product, under infrared spectroscopy, reveals no absorption for epoxy. The product is stored for later use.

EXAMPLE X

Preparation of Epoxy/Diol Adduct Polyol

This example illustrates the preparation of an epoxy/diol adduct from an aliphatic epoxy and a branched chain aliphatic diol. Bisphenol A epichlorohydrin epoxy resin Eponex 151 (trademark, Shell Chemical Company), 234. g, 2-ethyl-1,3-hexanediol, 146. g, and N,N-dimethylethanol amine, 1. g are combined and heated at 120°-140° C. for about 20 hours. The product, under infrared spectroscopy, shows no absorption for epoxy. The product is stored at room temperature.

EXAMPLE XI

Preparation of Epoxy/Diol Adduct Polyol

The example illustrates the preparation of an aliphatic epoxy/aliphatic diol adduct. Bisphenol A epichlorohydrin epoxy resin Eponex 151 (trademark, Shell Chemical Company), 234. g, 1,5-pentanediol, 104. g, and N,N-dimethylethanol amine are heated at 120°-140° C. for about 20 hours. The product, under infrared spectroscopy, shows no absorption for epoxy. The product is stored at room temperature.

EXAMPLE XII

Preparation of Coating Composition and Cured Coating

A typical coating composition according to the invention was prepared as follows. Diblocked diisocyanate diurea oligomer prepared according to the procedure of Example III, 110. g, is combined with polyol consisting of epoxy/diol adduct, specifically Epon 828/1,5-pentanediol prepared according to the procedure of Example IX, 60. g, hexamethoxymethylmelamine, 38. g, and paratoluene sulfonic acid, 1. g, in 20. g, methyl ethyl ketone. Bare, unpolished steel panels are coated with the above composition and baked at 180° C. for 20 minutes. The cured coating is found to have good solvent, humidity and corrosion resistance.

EXAMPLE XIII

Preparation of Coating Composition and Cured Coating

A pigment coating composition according to the invention is prepared consisting of the pigments and binder package listed below.

| Pigment Package | |
|---|---|
| Grams | Pigment |
| 4.3 | silica |
| 48.4 | barytes |
| 0.6 | carbon black |
| 6.5 | titanium dioxide |

| Binder Package | |
|---|---|
| Grams | |
| 110. | diblocked diisocyante |
| 60. | polyol |
| 38. | hexamethoxymethylmelamine |
| 1. | para-toluene sulfonic acid |
| 30. | 1:2 butyanol methyl amyl ketone |

The diblocked diisocyanate diurea oliogmer is that prepared according to the method of Example III. The polyol consists of an epoxy/diol adduct, specifically Epon 828/1,5-pentanediol prepared according to the method of Example IX. Bare, unpolished steel panels are coated with the above composition and baked at 180° C. for 20 minutes. The cured coating is found to have good solvent, humidity and corrosion resistance.

Particular embodiments of the present invention described above are illustrative only and do not limit the scope of the invention. It will be apparent to the skilled of the art in view of the foregoing disclosure that modifications and substitutions can be made without departing from the scope of the invention.

We claim:

1. A resin composition comprising:
   chain-extendable, crosslinkable polyol of molecular weight about 200 to 1000, being the reaction product of a diepoxide of molecular weight about 100 to about 1000, with a diol of molecular weight about 60 to 500, said polyol having at least three hydroxyl groups, selected from polyhydroxy functional straight or branched chain saturated or unsaturated hydrocarbons, optionally comprising one or more oxy or ester moieties and optionally comprising one or more heterocyclic atoms, aromatic and/or heterocyclic rings, the heterocyclic atom(s) being selected from N, O and S;
   chain-extendable, diblocked diisocyanate diurea oligomer of molecular weight about 300 to 1500, comprising the reaction product of a half-blocked diisocyanate with diamine in molar ratio of about 2:1, respectively, the blocking group of which oligomer has a de-blocking temperature of about 100° C. to about 190° C.; and
   crosslinking agent reactive with the hydroxy functionality of said polyol and substantially unreactive with de-blocked isocyanate functionality of said diblocked diisocyanate diurea oligomer, wherein said crosslinking agent and said polyol are present in a molar equivalent ratio of about 1:1 to about 1:15, respectively.

2. The resin composition of claim 1, wherein said diepoxide has a molecular weight of about 100 to 700.

3. The resin composition of claim 1, wherein said diepoxide bears two terminal epoxide functionality.

4. The resin composition of claim 1, wherein said diepoxide is selected from the group consisting of Bisphenol A epichlorohydrin epoxy resin, hydantoin epoxy resin, cyclic aliphatic diepoxide, acyclic aliphatic diepoxide and a mixture of any of them.

5. The resin composition of claim 1, wherein said diol has a molecular weight of about 60 to 200.

6. The resin composition of claim 1, wherein said diol bears two terminal hydroxy functionality.

7. The resin composition of claim 1, wherein said diol is selected from the group consiting of alkyl substituted or unsubstituted propanediol, butanediol, pentanediol, hexanediol, and a mixture of any of them.

8. The resin composition of claim 1, wherein said diol comprises aromatic diol wherein each hydroxyl group is substituted on the same benzene ring or on different benzene rings linked through a covalent bond or through one or more carbons of a one to seven carbon aliphatic moiety.

9. The resin composition of claim 8, wherein said diol is selected from the group consisting of Bisphenol A, Bisphenol B, catechol and a mixture of any of them.

10. The resin composition of claim 1, wherein said crosslinking agent comprises an aminoplast crosslinking agent.

11. The composition of claim 10, wherein said crosslinking agent comprises polyalkyl ethers of the polymethlol melamines, wherein each said alkyl moiety comprises about one to three carbons.

12. The composition of claim 11, wherein said crosslinking agent is hexamethoxymethylmelamine.

13. A resin composition comprising:
   A. chain-extendable, crosslinkable polyol of molecular weight about 300 to 700 and having at least three hydroxyl groups, said polyol being the reaction product of aliphatic diol of two to about six carbons, bearing two terminal hydroxyl groups, with Bisphenol A epichlorohydrin epoxy resin of molecular weight about 100 to 700, wherein said diol and said epoxy resin are reacted in a molar ratio of about 1:1;
   B. a chain-extended diblocked diisocyanate diurea oligomer reaction product of diamine selected from the group consisting of alkylene diamine of about 3 to about 12 carbons bearing two terminal amine functionality, isophorone diamine, toluene diamine, 4,4'-methylenedianiline and a mixture of any of them, with the half-blocked organic diisocyanate reaction product of organic diisocyanate of molecular weight less than about 250 with an approximately equal molar amount of monofunctional blocking agent selected from the group consisting of amides, ketoximes, phenols and alkanols of one to about eight carbons and a mixture of any of them, said diamine and said half-blocked diisocyanate being reacted in a molar ratio of about 1:2, respectively, said oligomer having a deblocking temperature of about 140° C. to about 160° C., and said oligomer and said polyol being present in molar ratio of about 1:1;
   C. crosslinking agent reactive with the hydroxy functionality of said polyol and substantially unreactive with free isocyanate functionality of said oligomer, selected from the group consisting of polyalkyl ethers of polymethlol melamines, said crosslinking agent and said polyol being present in a weight ratio of about 1:1 to about 1:5, respectively; and
   D. organic solvent.

14. The resin composition of claim 13, wherein said blocking agent is selected from the group consisting of butanol, 2-ethylhexanol, phenol, caprolactam and a mixture of them.

15. The resin composition of claim 13, wherein said crosslinking agent is hexamethoxymethylmelamine.

16. The resin composition of claim 13 further comprising about 0.1% to about 1% be weight catalyst comprising paratoluenesulfonic acid.

17. The resin composition of claim 13 further comprising about 0.1% to about 1% by weight catalyst comprising dibutyl tin dilaurate.

18. The resin composition of claim 13, wherein the diol reactant for said polyol is 1,4-butanediol.

19. The resin composition of claim 13, wherein said diamine is 1,6-hexanediamine.

* * * * *